US009464894B2

(12) United States Patent
Napier et al.

(10) Patent No.: US 9,464,894 B2
(45) Date of Patent: Oct. 11, 2016

(54) LOCALISING A VEHICLE ALONG A ROUTE

(71) Applicant: The Chancellor Masters and Scholars of The University of Oxford, Oxford, Oxfordshire (GB)

(72) Inventors: Ashley Alan Napier, Oxfordshire (GB); Paul Michael Newman, Oxfordshire (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/348,435

(22) PCT Filed: Sep. 27, 2012

(86) PCT No.: PCT/GB2012/052402
§ 371 (c)(1),
(2) Date: Mar. 28, 2014

(87) PCT Pub. No.: WO2013/045935
PCT Pub. Date: Apr. 4, 2013

(65) Prior Publication Data
US 2014/0249752 A1  Sep. 4, 2014

(30) Foreign Application Priority Data

Sep. 30, 2011  (GB) .................................. 1116958.8

(51) Int. Cl.
*H03F 1/26* (2006.01)
*G01C 11/12* (2006.01)
*G01C 21/00* (2006.01)
*G06T 7/20* (2006.01)
*G01C 21/26* (2006.01)

(52) U.S. Cl.
CPC ............. *G01C 11/12* (2013.01); *G01C 21/005* (2013.01); *G01C 21/26* (2013.01); *G06T 7/204* (2013.01)

(58) Field of Classification Search
USPC ............ 701/523, 409, 469; 348/148–1, 118; 356/4.01; 703/2; 702/189; 600/473
See application file for complete search history.

(56) References Cited

U.S. PATENT DOCUMENTS 5,517,419 A * 5/1996 Lanckton et al. ............ 701/409
6,194,860 B1 * 2/2001 Seelinger et al. ............ 318/587
(Continued)

FOREIGN PATENT DOCUMENTS

GB        2162014 A      1/1986
JP     2015227139 A  * 12/2015 ............. B60R 21/00
(Continued)

OTHER PUBLICATIONS

Anselm Spoerri, Novel Route Guidance Displays, IEEE Vehicle Navigation & Information Systems conference, Oct. 1993, Ottawa, Canada.*
(Continued)

*Primary Examiner* — Cuong H Nguyen
(74) *Attorney, Agent, or Firm* — Finch & Maloney PLLC

(57) ABSTRACT

A method and apparatus are disclosed for localizing a vehicle along a route. The method comprises initially surveying the route to be traversed by the vehicle by creating a plurality of orthographic images of the route, at a plurality of locations along the route and subsequently passing the vehicle along the route while obtaining a current view of the route. The method further comprises resolving a pose of the vehicle relative to a survey trajectory by maximizing a relation between the orthographic images and the current view.

21 Claims, 10 Drawing Sheets

(56) References Cited

U.S. PATENT DOCUMENTS

| | | | |
|---|---|---|---|
| 7,693,654 B1 | 4/2010 | Dietsch et al. | |
| 8,290,305 B2 | 10/2012 | Minear et al. | |
| 8,447,474 B2* | 5/2013 | Breed | 701/46 |
| 8,478,642 B2* | 7/2013 | Dey | G01C 21/3484 705/14.4 |
| 8,626,392 B2* | 1/2014 | Kojo | 701/41 |
| 2007/0071311 A1 | 3/2007 | Rovira-Mas et al. | |
| 2008/0033645 A1* | 2/2008 | Levinson et al. | 701/213 |
| 2009/0005961 A1* | 1/2009 | Grabowski et al. | 701/200 |
| 2009/0076655 A1 | 3/2009 | Blondel et al. | |
| 2010/0013615 A1 | 1/2010 | Hebert et al. | |
| 2010/0106356 A1 | 4/2010 | Trepagnier et al. | |
| 2010/0106603 A1* | 4/2010 | Dey | G01C 21/3484 705/14.63 |
| 2010/0114416 A1* | 5/2010 | Au et al. | 701/23 |
| 2010/0121577 A1* | 5/2010 | Zhang et al. | 701/301 |
| 2010/0183192 A1* | 7/2010 | Fritsch et al. | 382/103 |
| 2010/0245573 A1* | 9/2010 | Gomi et al. | 348/148 |
| 2011/0123135 A1 | 5/2011 | Hsieh et al. | |
| 2011/0205338 A1 | 8/2011 | Choi et al. | |
| 2012/0050525 A1* | 3/2012 | Rinner et al. | 348/117 |
| 2012/0123642 A1* | 5/2012 | Kojo | 701/41 |
| 2012/0203431 A1* | 8/2012 | Kojo et al. | 701/41 |
| 2013/0120578 A1* | 5/2013 | Iga et al. | 348/148 |
| 2013/0162829 A1* | 6/2013 | Kadowaki et al. | 348/148 |
| 2014/0233010 A1 | 8/2014 | Baldwin et al. | |
| 2014/0240501 A1 | 8/2014 | Newman et al. | |
| 2014/0240690 A1 | 8/2014 | Newman et al. | |

FOREIGN PATENT DOCUMENTS

| | | | | |
|---|---|---|---|---|
| WO | | 2013045917 A1 | 4/2013 | |
| WO | | 2013045927 A1 | 4/2013 | |
| WO | | 2013045932 A1 | 4/2013 | |
| WO | | 2013045935 A1 | 4/2013 | |
| WO | WO 2015186294 A1 * | 12/2015 | | B60R 21/00 |

OTHER PUBLICATIONS

Stephen Scott-Young, Seeing the Road Ahead: GPS-Augmented Reality Aids Drivers, GPS World magazine, Nov. 1, 2003, the front cover and pp. 22-28, vol. 14, No. 11, published monthly by Questex Media Group, Santa Ana, CA, USA.*

Generation and exploitation of local orthographic imagery for road vehicle localisation; Ashley Napier; Paul Newman; Intelligent Vehicles Symposium (IV), 2012 IEEE; Year: 2012; pp. 590-596, DOI: 10.1109/IVS.2012.6232165.*

Visual topometric localization; H. Badino; D. Huber; T. Kanade; Intelligent Vehicles Symposium (IV), 2011 IEEE; Year: 2011; pp. 794-799, DOI: 10.1109/IVS.2011.5940504.*

Real-time side scan image generation and registration framework for AUV route following; Peter King; Andrew Vardy; Peter Vandrish; Benjamin Anstey; 2012 IEEE/OES Autonomous Underwater Vehicles (AUV); Year: 2012; pp. 1-6, DOI: 10.1109/AUV. 2012.6380758.*

View-based localization in outdoor environments based on support vector learning; H. Morita; M. Hild; J. Miura; Y. Shirai; 2005 IEEE/RSJ International Conference on Intelligent Robots and Systems; Year: 2005; pp. 2965-2970, DOI: 10.1109/IROS.2005. 1545445.*

International Preliminary Report on Patentability received for Patent Application No. PCT/GB2012/052402, mailed on Apr. 10, 2014, 8 pages.

International Search Report and Written Opinion of The International Searching Authority received for Patent Application No. PCT/GB2012/052402, mailed on Dec. 6, 2012, 12 pages.

GB Intellectual Property Office Search Report under Section 17(5) received for GB Patent Application No. 1116958.8, mailed Dec. 15, 2011, 3 pages.

Furgale et al., "Visual Teach and Repeat for Long-Range over Autonomy," Journal of Field Robotics, vol. 27, No. 5, Sep. 1, 2010, pp. 534-560.

Lategahn, et al., "Visual SLAM for Autonomous Ground Vehicles," IEEE International Conference on Robotics and Automation, May 9-13, 2011, 6 pages.

Royer et al., "Monocular Vision for Mobile Robot Localization and Autonomous Navigation," International Journal of Computer Vision, Kluwer Academic Publishers, BO, vol. 74, No. 3, Jan. 13, 2007, pp. 237-260.

Scaramuzza, et al., "Exploiting Motion Priors in Visual Odometry for Vehicle-Mounted Cameras with Non-holonomic Constraints," IEEE/RSJ International Conference on Intelligent Robots and Systems, Sep. 25-30, 2011, 8 pages.

Segvic, et al., "A mapping and localization framework for scalable appearance-based navigation," Computer Vision and Image Understanding, Academic Press, US, vol. 113, No. 2, Feb. 1, 2009, pp. 172-187.

Tomasi, et al., "Shape and Motion from Image Streams Under Orthography: A Factorization Method," International Journal of Computer Vision, Kluwer Academic Publishers, Norwell, US, vol. 9, No. 2, Nov. 1, 1992, pp. 137-154.

Levinson et al., "Robust Vehicle Localization in Urban Environments Using Probabilitic Maps", Stanford University, 2010 IEEE International Conference on Robotics and Automation, May 2010, pp. 4372-4378, 7 pages.

Glennie et al., "Static Calibration and Analysis of the Velodyne HDL-64E S2 for High Accuracy Mobile Scanning", Remote Sensing, 2, 1610-1624; doi: 10.3390/rs 2061610, 15 Pages.

Harrison et al., "TICSync: Knowing When Things Happened", 2011 IEEE International Conference on Robotics and Automation, May 2011, pp. 356-363, 8 pages.

International Preliminary Report on Patentability received for Patent Application No. PCT/GB2012/052381, mailed on Apr. 10, 2014, 11 pages.

International Search Report and Written Opinion of The International Searching Authority received for Patent Application No. PCT/GB2012/052381, mailed on Dec. 12, 2012, 17 pages.

GB Intellectual Property Office Search Report under Section 17(5) received for GB Patent Application No. 1116959.6 mailed Jan. 24, 2012, 3 pages.

Stewart, et al., "LAPS-Localisation using Appearance of Prior Structure: 6DoF Monocular Camera Localisation using Prior Pointclouds," IEEE International Conference on Robotics and Automation, RiverCentre, Saint Paul, Minnesota, May 14-18, 2012, pp. 2625-2632.

Cole, et al., "Using Laser Range Data for 3D SLAM in Outdoor Environments," IEEE International Conference on Robotics and Automation, Orlando, Florida, May 15-19, 2006, pp. 1556-1563.

Moosmann, et al., "Velodyne SLAM," IEEE Intelligent Vehicles Symposium (IV), Baden-Baden, Germany, Jun. 5-9, 2011, pp. 393-398.

Baldwin, et al., "Road vehicle localization with 2D push-broom LIDAR and 3D priors," IEEE International Conference on Robotics and Automation, RiverCentre, Saint Paul, Minnesota, May 14-18, 2012, pp. 2611-2617.

Wulf, et al., "Robust Self-Localization in Industrial Environments based on 3D Ceiling Structures," IEEE International Conference on Intelligent Robots and Systems, Oct. 9-15, 2006, Beijing, China, pp. 1530-1534.

Viola, et al., "Alignment by Maximization of Mutual Information," International Journal of Computer Vision, Kluwer Academic Publishers, vol. 24, No. 2, Sep. 1, 1997, pp. 137-154.

Weste, et al., "Dynamic Time Warp Pattern Matching Using an Integrated Multiprocessing Array," IEEE Transactions on Computers, vol. C-32, No. 8, Aug. 1, 1983, pp. 731-744.

International Preliminary Report on Patentability received for Patent Application No. PCT/GB2012/052393, mailed on Apr. 10, 2014, 8 pages.

International Search Report and Written Opinion of The International Searching Authority received for Patent Application No. PCT/GB2012/052393, mailed on Jan. 3, 2013, 12 pages.

(56) References Cited

OTHER PUBLICATIONS

GB Intellectual Property Office Search Report under Section 17(5) received for GB Patent Application No. 1116961.2 mailed Mar. 22, 2012, 3 pages.
Jordt, et al., "Automatic High-Precision Self-Calibration of Camera-Robot Systems," IEEE International Conference on Robotics and Automation, Kobe, Japan—May 12-17, 2009, pp. 1244-1249.
Saez, et al., "Underwater 3d SLAM through Entropy Minimization," IEEE International Conference on Robotics and Automation, Orlando, Florida—May 15-19, 2006, pp. 3562-2567.
Underwood, et al., "Error Modeling and Calibration of Exteroceptive Sensors for Accurate Mapping Applications," Journal of Field Robotics, vol. 27, No. 1., Jan. 1, 2010, pp. 2-20.
Sheehan, et al., "Automatic Self-Calibration of a Full Field-of-View 3D n-Laser Scanner," International Symposium on Experimental Robotics, Delhi, India, Dec. 18, 2010, 14 pages.
International Preliminary Report on Patentability received for Patent Application No. PCT/GB2012/052398, mailed on Apr. 10, 2014, 8 pages.
International Search Report and Written Opinion of The International Searching Authority received for Patent Application No. PCT/GB2012/052398, mailed on Dec. 6, 2012; 13 pages.
GB Intellectual Property Office Search Report under Section 17(5) received for GB Patent Application No. 1116960.4 mailed Jul. 6, 2012, 3 pages.

\* cited by examiner $I_\pi(X_i)$
Synthetic Orthographic
Image 700 meter Trajectory Around Begbroke Deviation from Survey Trajectory

LOCALISING A VEHICLE ALONG A ROUTE

The present invention relates to an apparatus and a method for localising a vehicle along a route.

Vehicle localisation has been a vigorously researched topic over the last few decades. For road vehicles especially, a recent approach used by Behringer et al.—An Autonomous Ground Vehicle for Desert Driving in the DARPA Grand Challenge 2005, Intelligent Transportation Systems, 2005 Proceedings 2005 IEEE, pages 644-649, 2005 and Chen et al.—Developing a Completely Autonomous Vehicle, Intelligent Systems, IEEE, 19(5):8-11, 2004, is to use some combination of differential global positioning systems (DGPS), inertial and 3D laser sensing coupled with a prior survey.

The motivation of the present inventors is the generation of a high precision localisation without a reliance on external infrastructure or workspace modification. Localisation and pose estimation derived from local sensors suffers from compounding errors. For example, stereo Visual Odometry (VO) produces locally metric maps and trajectories. However, when extending to larger scales without correction the metric precision is lost and maps and trajectories become only topologically correct. Small angular errors, which over the course of a few hundred meters will lead pose estimates to be tens of meters in error. This makes "knowing where you are" impossible without some sort of correction or reference to prior data.

Previous work using a VO system, such as that performed by Napier et al.—Real-time Bounded-Error Pose Estimation for Road Vehicles using Vision, Intelligent Transportation Systems (ITSC), 2010 13th International IEEE Conference on, pages 1141-1146, 2010, attempted to correct for these small errors using aerial images as prior information, thereby maintaining the metric accuracy and global consistency of trajectory estimates. A coarse-to-fine approach was adopted where progressively finer refinements to the pose estimates were made by matching images from the local stereo camera to aerial images. This approach produced pose estimates commensurate with the performance of off-the-shelf GPS over kilometer scales. A similar approach by Pink et al.—Visual Features for Vehicle Localization and Ego-Motion Estimation, Intelligent Vehicles Symposium, IEEE, pages 254-260, 2009, extracts road markings from aerial and camera images to perform the localisation. Another approach by Kummerle et al.—Large Scale Graph Based SLAM using Aerial Images as Prior Information. Proc. of Robotics: Science and Systems, 2009, extracts edges of buildings from aerial images for corrections using a 2D laser based system.

However, the suitability of aerial images for reliable and accurate correction of VO poses for road vehicles has its limitations. The road surface is often occluded by trees and bridges and image resolution is of the order of tens of centimeters per pixel.

Feature based methods have been shown by Furgale et al. Visual Teach and Repeat for Long Range Rover Autonomy. Journal of Field Robotics, 27(5):534-560, 2010, to be very sensitive to relatively small changes in view point, leading to a significant drop off in matched features available for localisation. FIG. 1 demonstrates how localisation using a feature based approach is not sufficient. Only 40% of the features are matched against the previous trajectory and after only 70 m with a small deviation from the previous traversal there are not enough matched features for localisation, leading to irrecoverable failure. In the interests of further illustrating this point, two manual relocalisations were performed each of which eventually led to localisation failure. Many point features are ephemeral, including vegetation, parked vehicles, and road speckle, which are all unlikely to be seen on subsequent traversals of the same route. The gross appearance of the road surface however, does not change for view point shifts experienced by a road vehicle, even when traveling in the opposite direction.

During a survey stage of a route to be traversed, the present inventors leverage a VO system to synthesise a continuous image strip of the road as seen from above, a synthetic local orthographic image. This strip need not be metrically correct over large scales (100 m) but locally it provides an excellent template against which to match views obtained during subsequent traversals. In contrast with many registration techniques the vehicle pose is not obtained with a feature based registration technique. Instead, the vehicle pose is obtained relative to a survey trajectory by maximising the mutual information between synthetic local orthographic images and a current, live view. The synthetic images allow localisation when traveling in either direction over the road surface. With this in hand global localisation is possible if the survey vehicle's trajectory has been post processed optimised into a single global frame.

According to a first aspect of the present invention, there is provided a method for localizing a vehicle along a route, the method comprising:
 surveying the route to be traversed by the vehicle by creating a plurality of orthographic images of the route, at a plurality of locations along the route;
 subsequently passing the vehicle along the route while obtaining a current view of the route; and,
 resolving a pose of the vehicle relative to a survey trajectory by maximising a relation between the orthographic images and the current view.

Advantageously, the method of the present invention replaces the previously used aerial images with synthetic local orthographic images of the route. For example, these images may generated by a survey vehicle and vehicle localization for subsequent traversals of a route is done relative to the survey vehicles trajectory. This approach allows generation of orthographic images under bridges, trees and in man-made structures such as multi story car parks and allows for a more accurate pose estimation than that exhibited by other approaches using aerial images. This method also has the advantage that only things which can be seen from a road vehicles perspective are included in the images, excluding roof tops and grassy fields etc. Preferably, the plurality of orthographic images of the route collectively comprise a continuous, overhead image of the route. The plurality of orthographic images preferably comprise a continuous overhead image strip of the route, the vehicle only need consider the section of the strip in its vicinity.

The relation between the orthographic images and the current view preferably comprises a comparison of the mutual information between the orthographic images and the current view.

Here, the orthographic images may be represented relative to a survey vehicle trajectory which is not necessarily metrically correct over large scales. The synthetic orthographic image generation is therefore not tied to a global frame, so does not require metric global consistency. There is no reliance on GPS, any external infrastructure or workspace modification. Synthetic orthographic images are generated at a resolution two orders of magnitude higher than the best available aerial images (5 mm per pixel). Accordingly, subsequent traversals of surveyed routes by a follow vehicle can then be localized against the survey trajectory using these high resolution, high fidelity orthographic images.

In an embodiment of the invention, the orthographic images created during the survey are obtained with a stereo camera, mounted on a survey vehicle. The stereo camera comprises at least a first and second imaging portion, such as a first and second camera, which are used to synthesise the orthographic images. In an embodiment, the first imaging portion is arranged to image at least a portion of a route track and at least a portion of a route environment, and the second imaging portion is preferably arranged to image only the route track. It is desirable that objects in the environment of the route, such as off the road are observed in the stereo images, as this improves the accuracy of the visual odometry.

According to a second aspect of the present invention there is provided an apparatus for localizing a vehicle along a route, the apparatus comprising a camera for obtaining images of the route as the vehicle traverses the route, a repository for storing orthographic images of the route, obtained during a survey of the route, a processor for resolving a pose of the vehicle along the route by processing images obtained with the camera, with the orthographic images of the route.

In an embodiment, the camera comprises a stereo camera.

According to a third aspect of the present invention there is provided a vehicle comprising the apparatus of the second aspect.

According to a fourth aspect of the present invention, there is provided a computer program element comprising: computer code means to make the computer execute a method according to the first aspect.

An embodiment of the present invention will now be described by way of example only and with reference to the accompanying drawings, in which.

Figure 1:
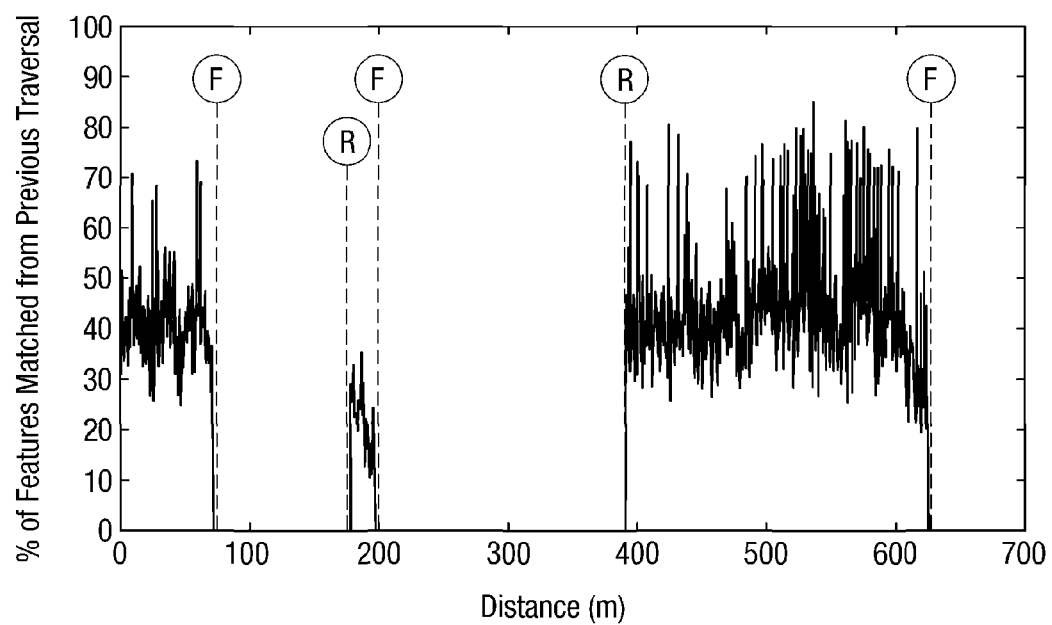
FIG. 1 is a graph illustrating the percentage of image features matched by a camera against a previous survey of a 700 m route.
Figure 2A:
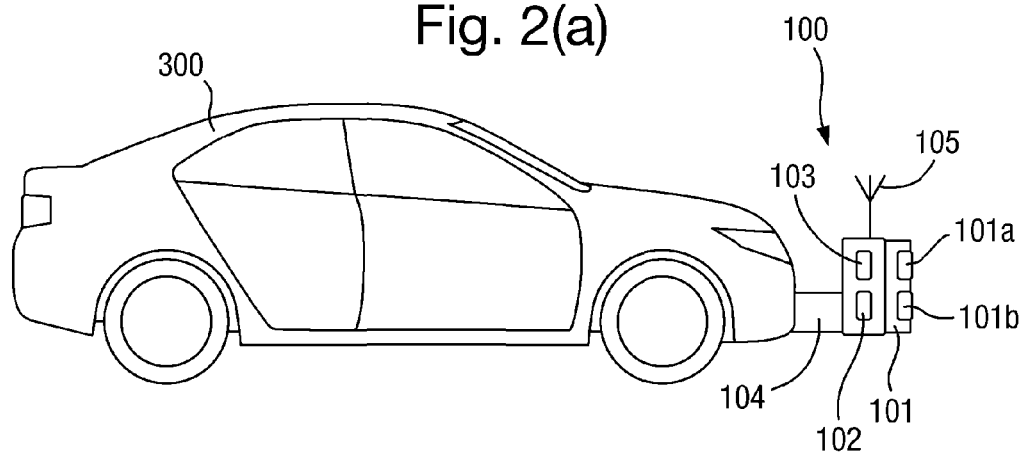
FIG. 2(a) is a schematic illustration of a vehicle comprising apparatus according to an embodiment of the present invention.
Figure 2B:
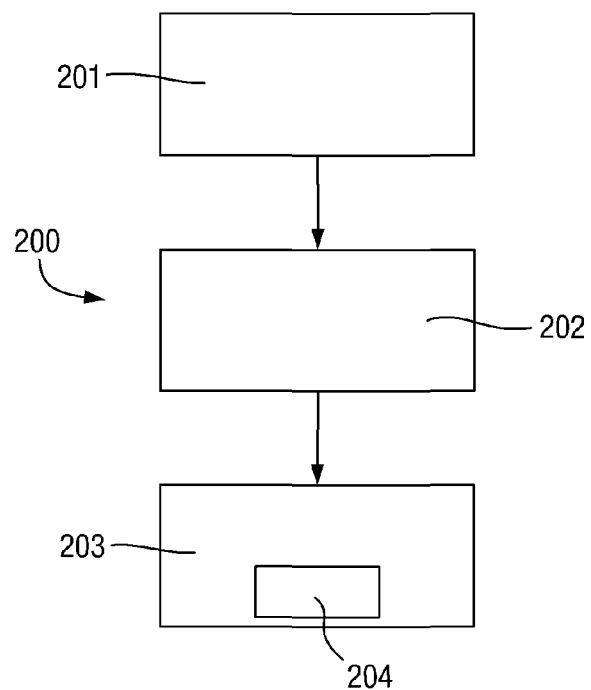
Figure 3:
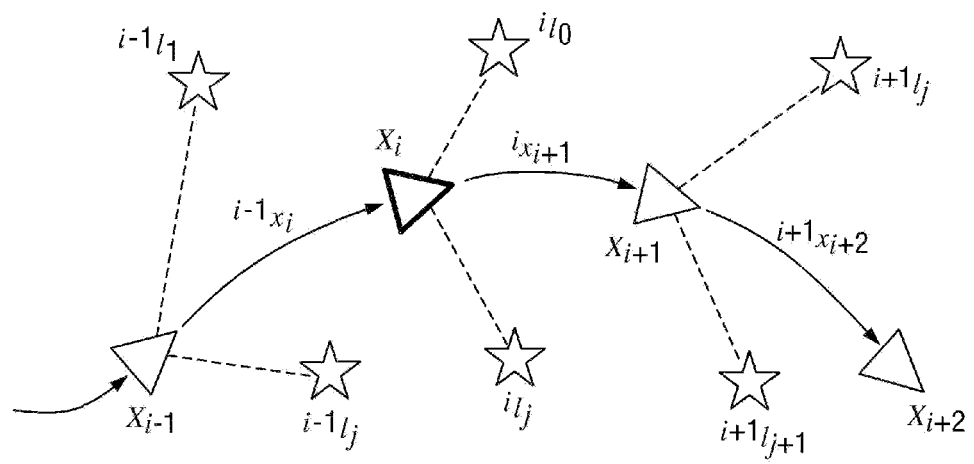
Figure 4:
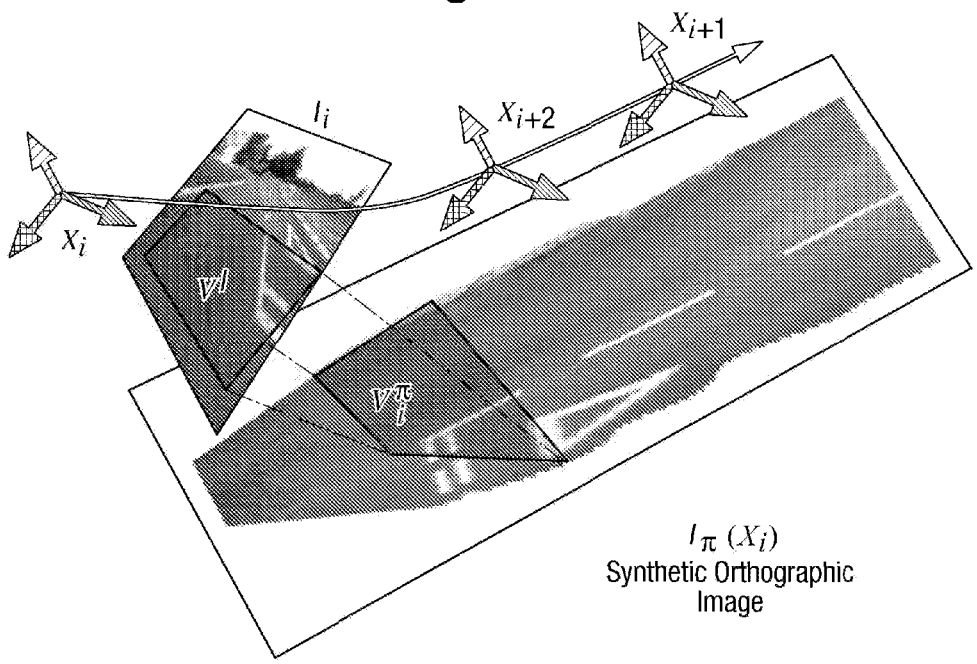
Figure 5:
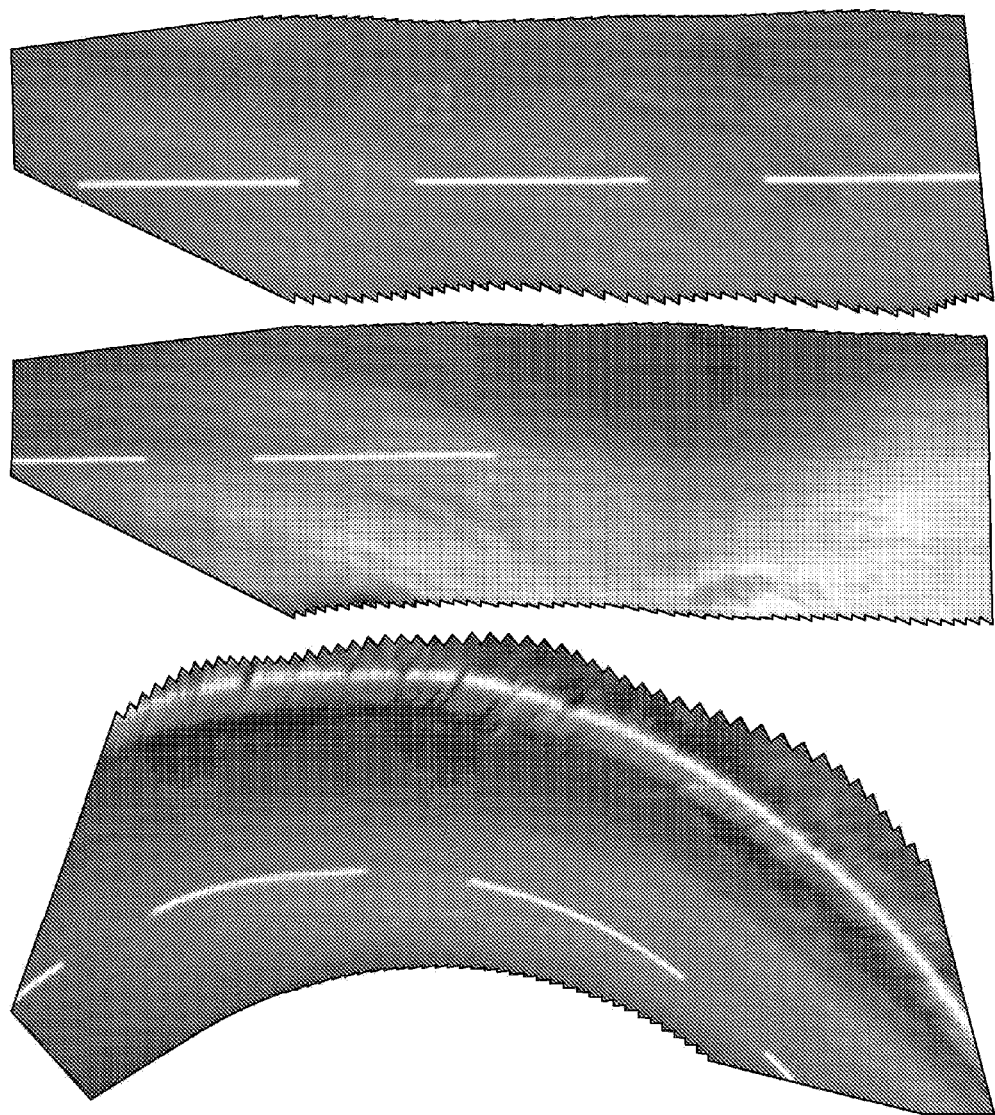
Figure 6:
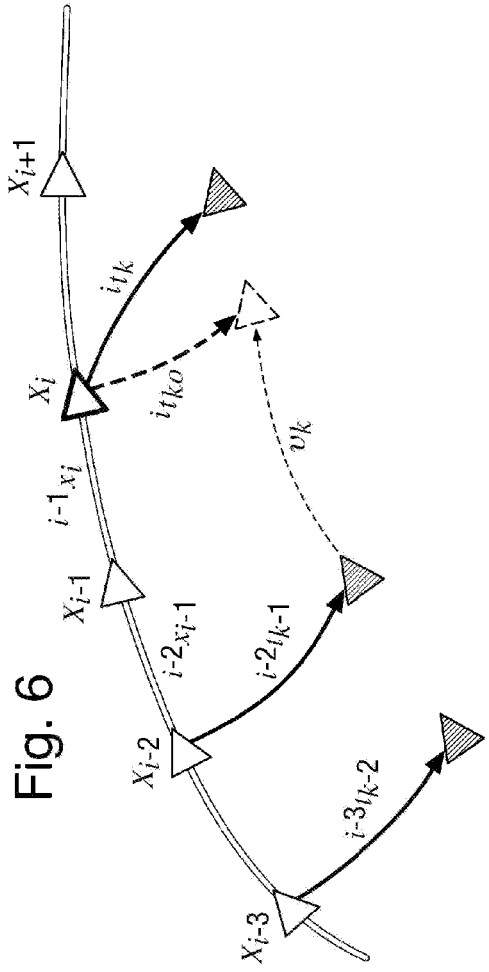
Figure 7:
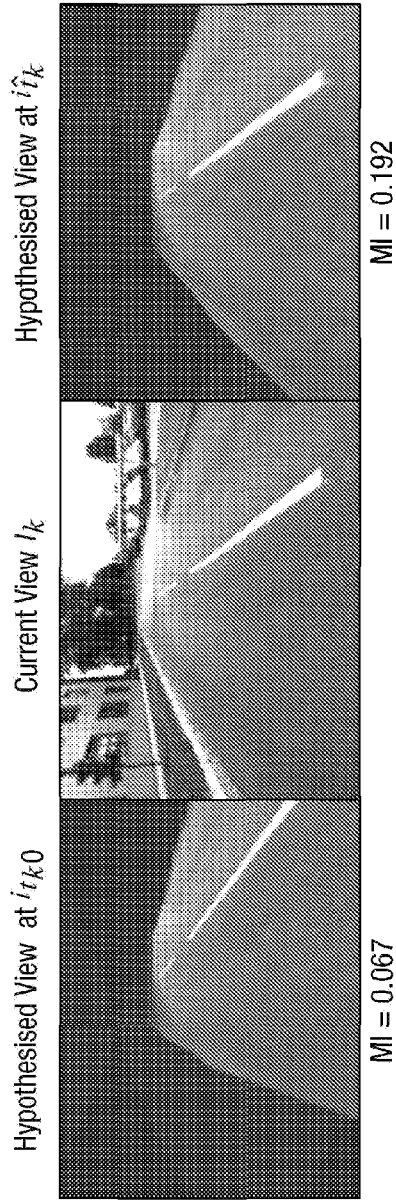
Figure 8A:
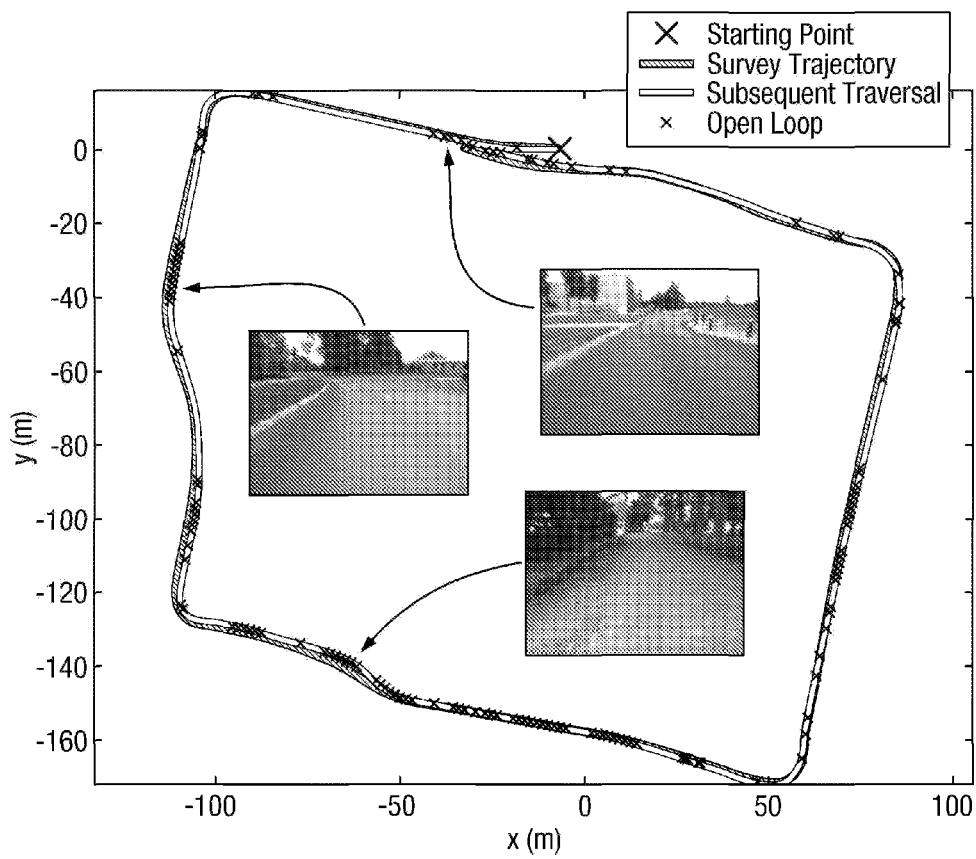

FIG. 2(b) is a flow chart outlining the sequence of steps associated with a method according to an embodiment of the present invention, FIG. 3 is a schematic illustration of the notation used for a simple VO trajectory and scene whereby relative poses between frames are represented by arrows and lowercase $^{i-1}x_i$, vehicle poses relative to $X_i$ are represented by triangles and uppercase $X_{i-1}$ and the location of a $j^{th}$ observed landmark from pose $X_i$ are represented by stars $^il_j$;

FIG. 4 illustrates the view $I_i$ at pose $X_i$ from the survey trajectory being projected onto a local ground plane to produce an orthographic image $I_\pi(X_i)$, with the road regions of interest $V^I$ and $V^\pi_i$ shown in blue;

FIG. 5 illustrates 10 m segments of a synthetic local orthographic images generated from the 700 m test route, with images (a) and (b) being generated from straight segments and image (c) being generated from part of a 90° corner;

FIG. 6 is a schematic illustration of a localisation framework, whereby the survey trajectory is shown in blue with vehicle nodes/poses $X_i$, a subsequent traversal of the route localised against the survey trajectory is shown in red $^it_k$, the current relative VO pose $v_k$ and subsequent corresponding seed for localisation $^it_{ko}$ are indicated by dashed lines;

FIG. 7 is an illustration of a view alignment between the live view and hypothesised views and their corresponding values for mutual information, whereby the left view illustrates the hypothesised view at $^it_{ko}$ provided by $v_k$, the middle view illustrates the live image $I_k$ and the right view illustrates the hypothesised view at the corrected pose $^i\hat{t}_k$;

FIG. 8(a) is a route around the Begbroke site which comprises approximately a 700 m loop approximated SE2 corrections, (b) localised pose distances from survey trajectory.

Figure 9A:
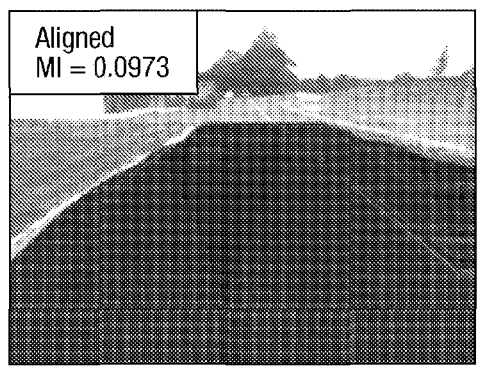
Figure 9B:
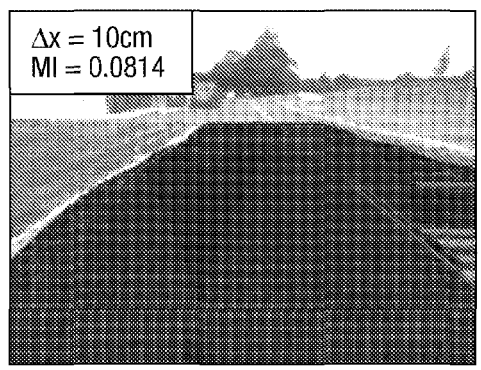
Figure 9C:
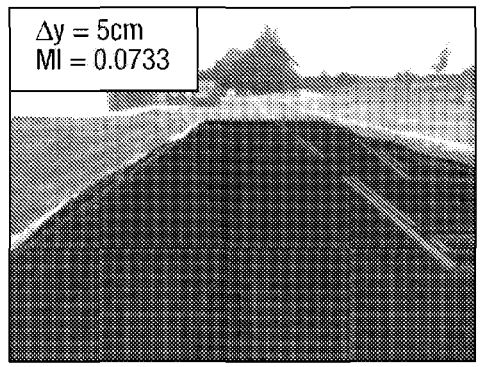
Figure 9D:
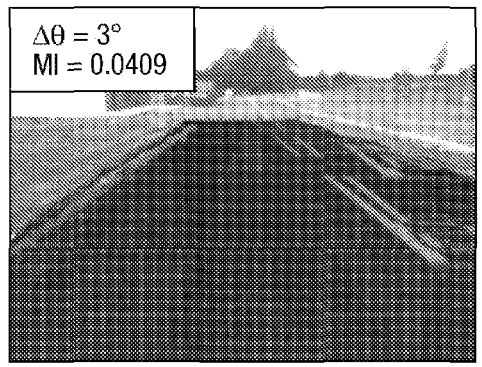
Figure 10:
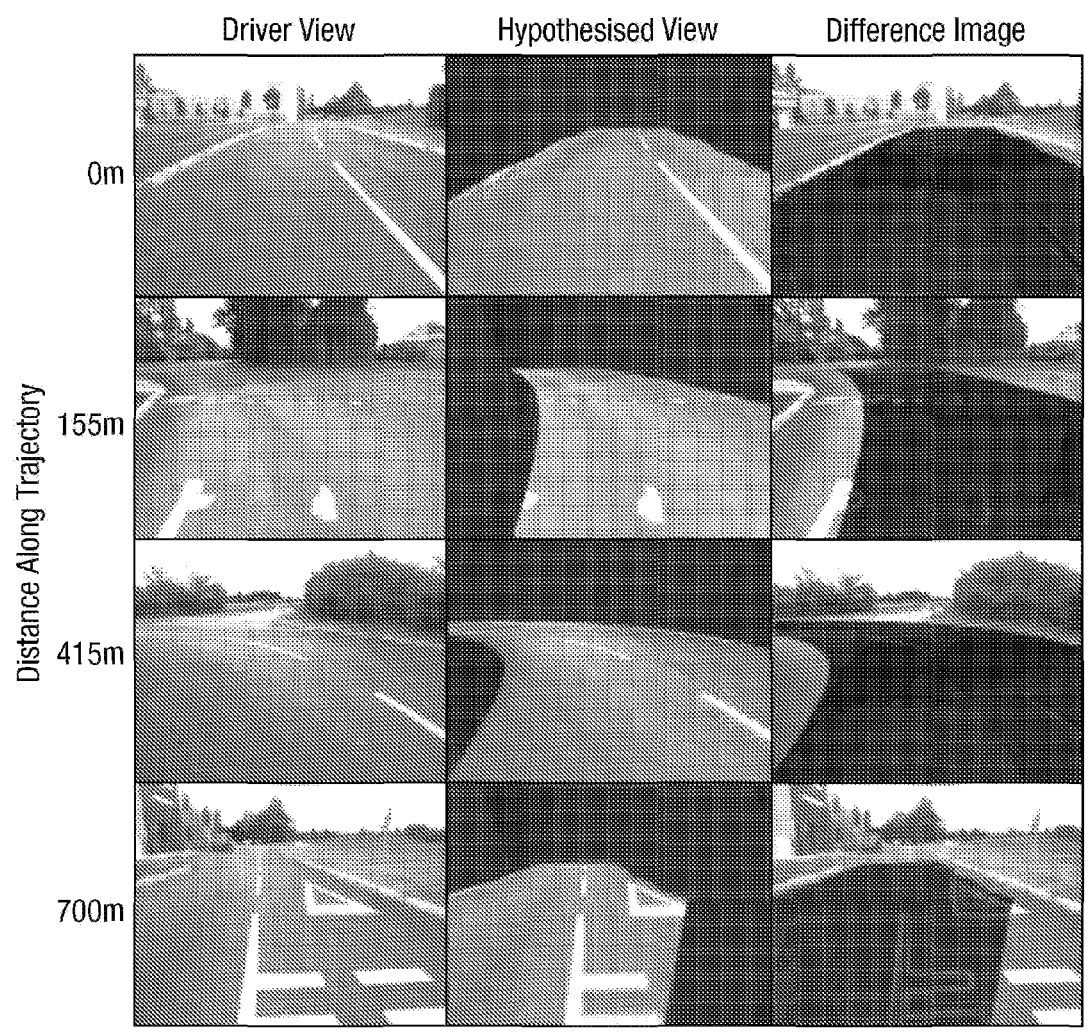
Figure 11:
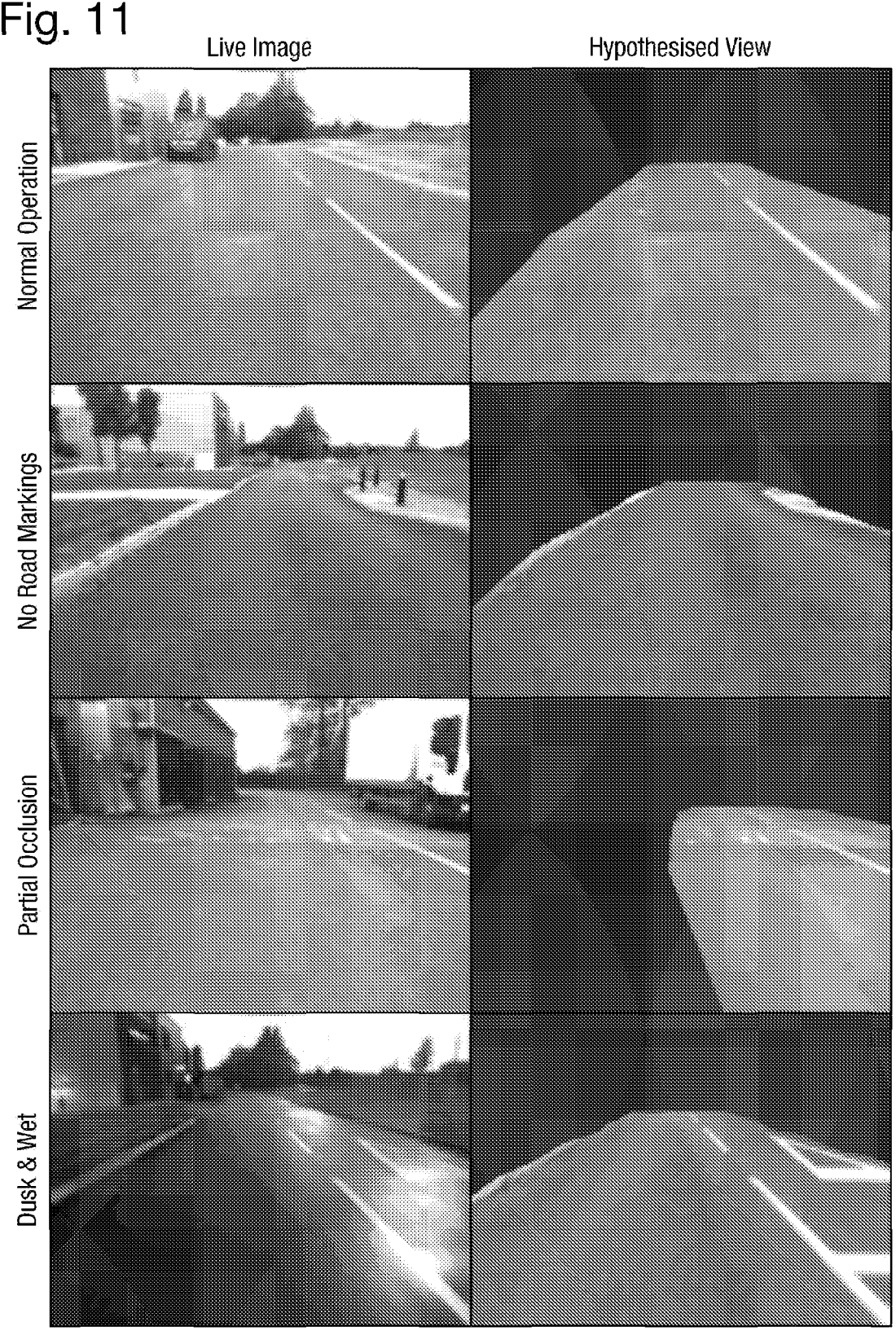
Figure 11:
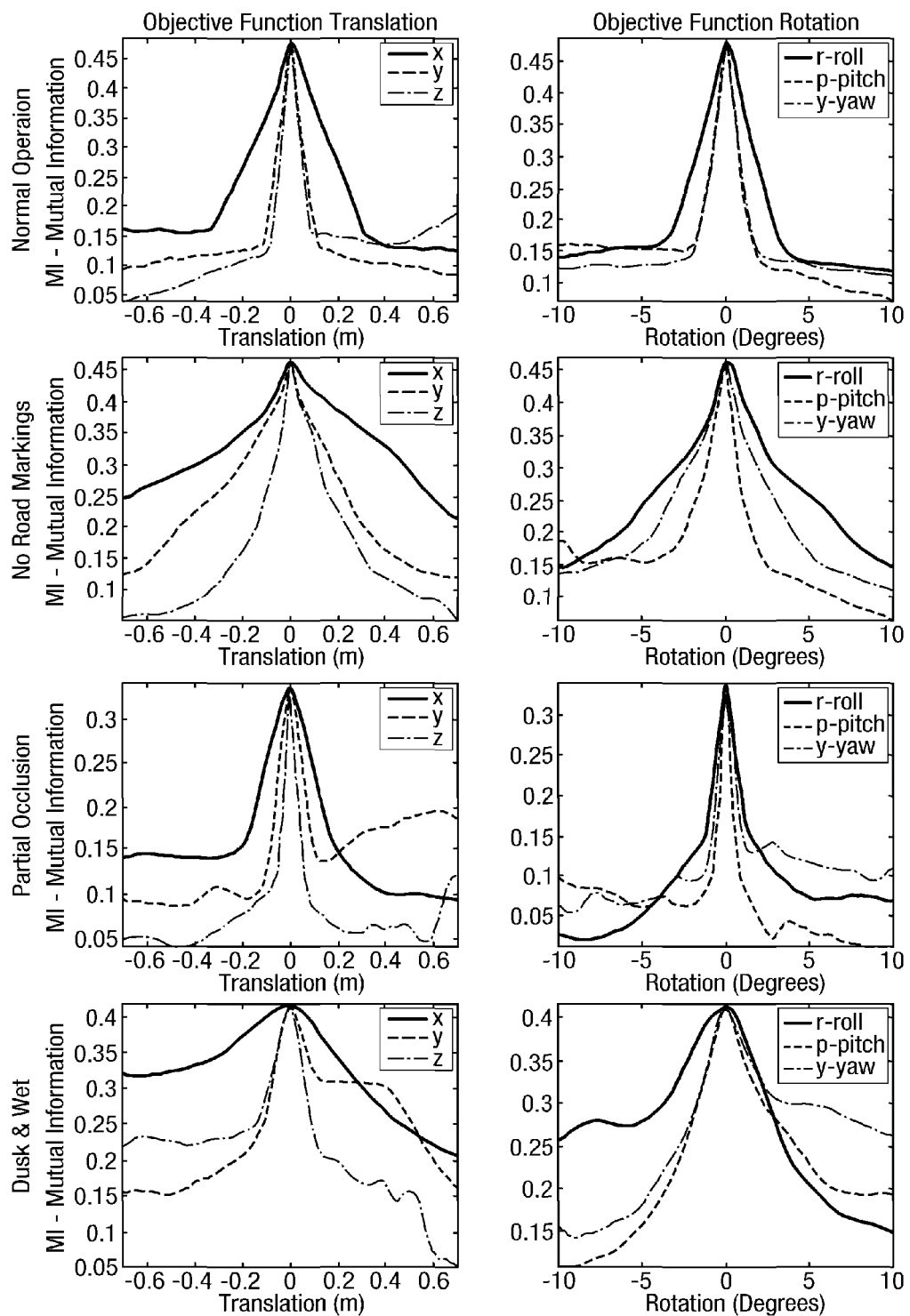

FIG. 9(a) illustrates the difference in image intensities between a driver view $I_k$ correctly localised relative to the survey trajectory and a hypothesised view proj($I_\pi(X_i),^it_k$) at $^it_k$ (white pixels correspond to larger differences in intensity), whereas FIGS. 9(b), 9(c) and 9(d) illustrate the miss alignment and corresponding drop in Mutual Information by artificially perturbing the pose by $\Delta x=10$ cm, $\Delta y=5$ cm, $\Delta\square=3°$ respectively;

FIG. 10 illustrates driver views $I_k$ and associated hypothesised views proj($I_\pi(X_i),^it_k$) demonstrating cm level alignment at various points along the 700 m trajectory with reference to FIG. 9; and, FIG. 11 illustrates the objective function (MI) convexity and robustness to partial occlusion, weather and lighting conditions—as the pose of the vehicle is shifted from it true value, the corresponding drop in MI demonstrates convexity in all 6 degrees of freedom, plotted at 1 cm and 0.2° intervals, respectively.

Referring to FIGS. 2a and 2b of the drawings, there is illustrated an apparatus 100 and a method 200 for localizing a vehicle 300 along a route, such as along a road surface. However, it is to be appreciated that in alternative embodiments, the vehicle could be any type of vehicle that may be travelling through any environment, provided the environment comprises permanent/semi-permanent route features, such as a permanent/semi-permanent road surface. In yet further embodiments, it is to be appreciated that the apparatus may be used to localise other transportable devices, such as hand held devices and robotic devices. The apparatus 100 comprises a camera, such as a stereo camera 101 having a first and second imaging portion 101a, 101b for imaging the route. The apparatus 100 further comprises a processor 102 for processing the images and a repository 103 for storing images of the route.

In order to localise the vehicle 300 (or other device) when traversing the route, the route is first surveyed at step 201 to create a plurality of orthographic images of the route. The vehicle 300 is subsequently passed along the route and the camera 101, mounted to a front bumper 104 of the vehicle 300, is arranged to acquire a live view of the route from the perspective of the vehicle 300 at step 202. The processor 102 subsequently processes the live view at step 203 according to a computer program element at step 204, to resolve the pose of the vehicle 300 relative to a survey trajectory, by maximising a relation between the orthographic images and the live camera view.

In the embodiment illustrated, the repository is mounted within the apparatus on the vehicle, however, it is to be appreciated that the repository may alternatively be disposed at a remote site and communicatively coupled with the processor via a communications link 105. It is envisaged that this would facilitate updates to be made to the route images centrally, in accordance with further surveys of the route, so that all vehicles which traverse the route can access the most up-to-date images of the route.

Referring to FIG. 3 of the drawings, a vehicle trajectory T, as generated by a visual odometry (VO) system, such as a stereo camera, is a set of relative SE3 transformations $^{i}x_{i+1}$ between consecutive vehicle poses $X_i$. The relative transform between $X_i$ and $X_{i+1}$ is written as $^{i}x_{i+1}$. In this way $T=\{^{0}x_1, {}^{1}x_2, \ldots {}^{N-1}x_N\}$ is a trajectory of N vehicle poses. Note that in the interest of clarity, $X_i$ may also comprise a vehicle node rather than as a pose, the reason being that one can imagine T as a chain graph of nodes linked by relative transformations. Each node in the graph has one or more 3D landmark features attached to it. The $j^{th}$ landmark attached to vehicle node i is denoted as $_{i}l_j$. The function $L(X_i)$ is used to represent the act of producing a local metric scene $M_i$ around $X_i$ which contains a set of local vehicle nodes and all attached landmarks in the frame of $X_i$ (so $X_i$ becomes the origin).

$$M_i = \left\{ \begin{array}{c} X_{i-1}, X_i, X_{i+1}, X_{i+2} \\ {}^{i-1}l_1, {}^{i-1}l_j, \ldots, {}^{i}l_0, {}^{i+1}l_{1+j}, \ldots, {}^{i+2}l_1, \ldots \end{array} \right\} \quad (1)$$

$$X_{i+2} = X_i \oplus {}^{i}x_{i+1} \oplus {}^{i+1}x_{i+2} \quad (2)$$

$$X_{i-1} = X_i \ominus {}^{i-1}x_i \quad (3)$$

Where $\oplus$ and $\ominus$ represent the composition and inverse composition operators respectively, such that $^{i}x_{i+1} \ominus {}^{i}x_{i+1}$ is the identity transformation.

When the vehicle subsequently passes along the route, knowledge gleaned from a previously recorded excursion (survey) is used to ensure localisation relative to the prior survey. A fundamental competency is the availability/generation of a synthetic orthographic image around a particular node $X_i$ in the survey trajectory T. The function $I_\pi(X_i)$ is used to denote the generation of this image which utilizes the local metric scene $M_i$ defined above. $I_\pi(X_i)$ can be computed during the vehicle traversal of the route, but can also be precomputed. The process begins with the extraction of a ground plane using the landmarks $_{i}l_j$ in $M_i$ and RANdom SAmple Consensus (RANSAC) to solve $$b_i^\pi \cdot \hat{n}_i^\pi = l \cdot \hat{n}_i^\pi \quad (4)$$

where $b_i^\pi$ is the base, $\hat{n}_i^\pi$ the normal and l an arbitrary point on the plane. In the present embodiment, a stereo camera 101 (FIG. 2a) mounted on a front bumper of the vehicle 300 is orientated such that a first imaging portion 101a comprises a least half of the road surface, assuming the vehicle is traversing relatively smooth urban roads. This orientation ensures many landmark measurements correspond to points on the road surface aiding ground plane estimation. Based on the stereo camera's orientation a Region Of Interest (ROI) $V^I = [V^I_1, \ldots, V^I_j]$ in the second imaging portion 101b, such as a left imaging portion, is set as a region likely to only contain road surface. Here $V^I_j = [u, v, 1]^T$ is a pixel location in homogeneous co-ordinates of the $j^{th}$ vertex of the ROI. The intersection of the rays associated with each $V^I_j$ and the local ground plane $(b_i^\pi, \hat{n}_i^\pi)$ are calculated. $V^I = [V^\pi_{i,1}, \ldots, V^\pi_{i,j}]$ is then the ROI projected onto the local ground plane around pose $X_i$.

$$V_{i,j}^\pi = \lambda_j K^{-1} V_j^I \quad (5)$$

$$\lambda_j = \frac{b_i^\pi \cdot \hat{n}_i^\pi}{[K^{-1} V_j^I] \cdot \hat{n}_i^\pi} \quad (6)$$

where K is the matrix of camera intrinsics, $K^{-1}V^I_j$ is the ray associated with $V^I_j$ and $\lambda_j$ is the distance along $K^{-1}V^I_j$ to the intersection with the ground plane. A homography $H_i$ is then generated from $V^I$ and $V^\pi_i$ such that $$V^I = H_i V_i^\pi \quad (7)$$

$H_i$ is then used to project the texture in the survey images ROI taken at $X_i$ into an orthographic image which is termed $I_\pi(X_i)$. This is done for all poses in scene the $M_i$. The camera frame rate of 20 Hz coupled with the survey vehicle's velocity of approximately 20 kph leads to adequate overlap between consecutive $V^\pi_i$ (road regions of interest projected onto the orthographic image $I_\pi(X_i)$). This presents an opportunity to combine ROIs for consecutive poses in $M_i$ by taking an average of intensity values. This generates an image of length defined by the poses in $M_i$ of the road surface as seen from overhead in the vicinity of $X_i$ (FIG. 4). Results presented in this paper use a resolution of 5 mm per pixel in $I_\pi(X_i)$ (Note that this resolution was chosen as a balance between accuracy and storage requirements, approx. 10 MB/km). Examples of images $I_\pi(X_i)$ associated with the test route are shown in FIG. 5. The image alignment accuracy is of the order $10^{-3}$ m and the images contain a high level of detail.

Consider now an image $I_k$ acquired on a subsequent traversal of a surveyed route at time k in the vicinity of $X_i$. The pose of the vehicle can now be represented relative to $X_i$ with $^{i}t_k$ which is the transformation between $X_i$ and the location of the vehicle at time k (See FIG. 6). If required the global pose of the vehicle $X_k$ is then simply $$X_k = X_i \oplus {}^{i}t_k \quad (8)$$

At run time the Stereo VO system provides a continual stream of estimates of the relative pose between camera frames $v_k$. In the absence of any other knowledge this could be used to infer the trajectory open loop. If however the synthetic orthographic images can be leveraged to correct relative poses from the VO, then it would be possible to track the motion (stay localised) relative to the survey trajectory. Furthermore, if as a new stereo pair is presented, it would be possible to use $v_k$ to seed a guess for the transformation $^{i}t_{ko}$ between the new camera frame and the survey trajectory, for the example in FIG. 6, $^{i}t_{ko}$ would be expressed as $$^{i}t_{ko} = \ominus^{i-1}x_i \ominus^{i-2}x_{i-1} \oplus^{i-2}t_{k-1} \oplus v_k \quad (9)$$

As the vehicle moves it is necessary to track the location relative to sequential poses in the trajectory—$X_i$ will change as the vehicle moves. However, this is a trivial data association problem; the transition to a new reference pose can be predicted using $v_k$ as indicated by the VO system. The goal of this work is then to develop a way to hone this initial estimate $^{i}t_{ko}$ and this is done by comparing the live view $I_k$ and that predicted by a hypothesized view of the synthetic orthographic image $I_\pi(X_i)$ at $^{i}t_k$.

The objective function used is based on Mutual Information (MI). If $^{i}t_k$ is known perfectly then the projection $proj(I_\pi(X_i), {}^{i}t_k)$ (hypothesized view) of the road lying in $I_\pi(X_i)$ into the live view $I_k$, would overlap completely. Conversely, if the pose is in error, the two views will not align and in particular will exhibit a markedly reduced amount of MI. The optimisation therefore finds a relative pose $^{i}\hat{t}_k$ which maximises image alignment by maximising MI (see FIG. 7). Note for normal operation images from the left stereo camera are used.

Mutual Information is used rather than a simple correlation based approach, as it has shown to be robust against varying lighting conditions and occlusions. The MI between two images I and I*, intuitively can be thought of the information shared between the two images. It is defined as follows.

$$MI(I,I^*)=H(I)+H(I^*)-H(I,I^*) \quad (10)$$

The MI is obtained by evaluating the Shannon entropy of the images individually H(I) and H(I*), and then evaluating the joint entropy H(I, I*). The entropy of a single image is a measure of how much information is contained within the image $$H(\mathcal{I}) = -\sum_{n=0}^{N} p_I(n)\log(p_I(n)) \quad (11)$$

Where $p_I(n)$ is the probability of a pixel in image I having intensity n. An image can therefore be thought of as a random variable with each pixel location x having a distribution defined by $p_I(n)=p(I(x)=n)$, for $n\epsilon[0,N]$, where N is the maximum intensity (in the present embodiment, N=255, since 8-bit grayscale images are used). The joint entropy is defined by $$H(\mathcal{I}, \mathcal{I}^*) = -\sum_{n=0}^{N}\sum_{m=0}^{N} p_{II^*}(n,m)\log(p_{II^*}(n,m)) \quad (12)$$

Where $p_{II^*}(n,m)=p(I(x)=n, I^*(x)=m)$ the joint probability of intensity co-occurrences in both images. The MI can then be written as $$MI(\mathcal{I}, \mathcal{I}^*) = \sum_{n=0}^{N}\sum_{m=0}^{N} p_{II^*}(n,m)\log\left(\frac{p_{II^*}(n,m)}{p_I(n)p_{I^*}(m)}\right) \quad (13)$$

As an implementation detail it was found empirically that evaluating the MI over all possible pixel intensity values had little advantage over histogramming intensities into bins. Quantising the intensity values into 16 bins has a welcome smoothing effect on the cost surface and eases optimisation. Another advantage of using MI over other plausible measures such as SSD (Sum of Square Distances) is that it is meaningfully bounded. The minimum MI is zero and the maximum is the minimum value of information contained within each of the images min(H(I),H(I*)).The maximum possible information for an image is also bounded as an image with a uniform distribution of pixel values.

The problem of estimating the current pose relative to a pose $X_i$ in the survey trajectory T then reduces to solving $$^i\hat{t}_k = \underset{^i t_k}{\operatorname{argmax}}\{MI(\mathcal{I}_k, proj(\mathcal{I}_\pi(X_i),{}^i t_k))\} \quad (14)$$

As the Stereo VO has high metric accuracy over small distances ~10 m, the deviation from the initial position estimates $^i t_{k_o}$ are relatively small, of the order of centimeters. Two approaches have been implemented for estimating $^i t_k$ the first is a fast approximate SE2 and the second a full SE3 pose correction.

The application domain is road vehicles so in the first approach to reduce complexity and increase speed $^i t_k$ is confined to in road plane motion, reducing the search space to SE2. However, the SE3 pose information is maintained which allows for a correction to rolling and pitching during cornering and accelerations respectively. Rather than solve eq 14 iteratively by for example using non-linear Gauss Newton methods, the small search radius is exploited and a histogram filter is used to evaluate an approximation to eq. 14. The in plane motion approximation has the consequence of reducing the sensitivity of the matching step to high frequency image content, such as fine texture on the tarmac. Very small errors in pitch, roll or height cause misalignments which stop the matching process from leveraging this fine detail. It is envisaged that the vehicle will typically operate in urban environments where the vast majority of roads have distinct road markings and so this was deemed to be an acceptable trade-off for speed. However, for short periods where there are no road markings the histogram filter can fall into local minima. This can lead to errors in the estimations of $^i\hat{t}_k$ which has the effect of pulling the trajectory off course. In order to avoid this, the difference between the corrected pose $^i\hat{t}_k$ in the survey trajectory and the initialisation from the Stereo VO $^i t_{k_o}$ was first computed.

$$e = {}^i\hat{t}_k \ominus {}^i t_{k_o} \quad (15)$$

If e is greater than a threshold then the right imaging portion 101a of the camera 101 is invoked, the localisation is performed on $I_{k,right}$ and a check is made for consensus. If the pose estimates from both $I_{k,right}$ and $I_k$ are commensurate, then the pose correction is adopted into the trajectory. If the pose estimates don't agree, then the match is ignored and $^i t_{k_o}$ is simply adopted into the trajectory. This is then repeated until matching can be reestablished. In essence when the image matching step fails the system falls back to raw VO and runs in Open Loop mode.

Figure 8B:
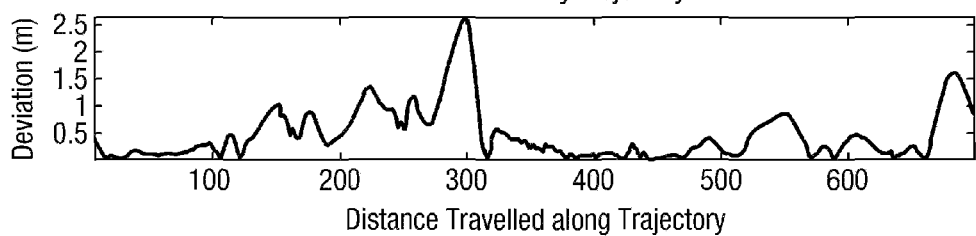

To evaluate the performance of the algorithm the present inventors conducted experiments on data collected from an autonomous vehicle platform, such as that illustrated in FIG. 2a of the drawings. The vehicle 300 was equipped with a multitude of sensors (not shown) and 32 processor cores available for computation. In this embodiment, the stereo VO camera comprises a Point Gray Bumblebee2, running at 640×480 at 20 fps and only 9 cores. The Stereo VO runs at frame rate on a single core. The localisation runs on 8 cores at a lower frequency, approximately 1 Hz, as correction is not required for every VO pose. The algorithm was implemented in Matlab, however the use of a histogram filter also lends itself perfectly to a GPU implementation, currently in development, which promises significant speed up and reduction in resource usage. FIG. 8(a) shows the 700 m survey trajectory (blue) overlaid with a subsequent traversal localised against the survey in (green). It should be noted that although the subsequent traversal is commensurate with the survey trajectory they should not align perfectly. This is because the survey vehicle may have driven at different positions on the road. The pose distance from the survey trajectory should therefore vary, but be bounded as shown in FIG. 8(b). FIG. 8(a), also shows when the consistency check is active and the system runs in open loop, it can be seen that this occurs when there are no road markings present. The local metric accuracy of the Stereo VO system allows localisation to run in open loop mode until the matching process is successfully reestablished. For the route shown here, matching was available 70% of the time and the vehicle completed a full 700 m loop of the site without any intervention or manual relocalisation as was required with feature based matching.

The precision of the localisation is obtained by comparing localized images $I_k$ and the corresponding artificially perturbed hypothesised views proj($I_\pi(X_i), {}^i t_k \oplus \epsilon$) where $\epsilon$ is a perturbation of the order of centimeters. FIG. 9, shows that by artificially perturbing the vehicle pose from its true value, a significant image misalignment and corresponding drop in MI are observed. FIG. 10 shows several frames taken from a subsequent traversal of the survey route localised using the above described method. From the difference images it can be seen that the two views are aligned to centimeter precision.

FIG. 11 demonstrates convexity, whereby the objective function (MI) is plotted around a true pose for all 6 degrees of freedom. Solving for all six degrees of freedom with no in plane motion constraint allows the matching step to leverage much finer detail and high frequency image content such as texture in the tarmac. FIG. 11 demonstrates how a significant peak and convexity is maintained in the Objective Function (MI) at the correct pose under various conditions. Here it can be seen that the Mutual Information as a correlation measure is robust against partial road occlusions, varying lighting and weather conditions. With the current MATLAB implementation, solving for SE3 pose corrections is not real time. However, an OpenCL implementation has demonstrated to exhibit an increase in speed of two orders of magnitude. Solving for the full SE3 pose corrections will allow the localisation method to be used in less urban environments, will reduce the amount of time in Open Loop mode as well as the need for consensus checking as the matching process is more readily available on a wider variety of road surfaces.

This work presents a methodology for generating and exploiting synthetic local orthographic images to achieve centimeter precision road vehicle localisation without any infrastructure or work space modification. The method improves accuracy by an order of magnitude on a previous method using off the shelf aerial images. Stereo VO is used to generate synthetic orthographic images from a survey vehicle which are far superior in terms of resolution and fidelity to available aerial images. The approach also facilitates the generation of orthographic images in areas unavailable to aerial photography such as under bridges, trees and covered areas. These images provide a high fidelity and stable template for view matching as unlike feature based systems the gross appearance of the road surface ahead of the vehicle is used. The approach also avoids all the tracking and data association required by feature based approaches. Centimeter level accurate localisation and pose tracking is demonstrated on a 700 m trajectory as well as robustness to partial occlusion and varying weather and lighting conditions.

The invention claimed is:

1. A method for localizing a vehicle along a route, the method comprising:
    surveying, by a survey vehicle, the route to be traversed by a subsequent vehicle by creating a plurality of orthographic images of the route with an image capture device mounted to the survey vehicle, at a plurality of locations along the route so as to define a survey vehicle trajectory;
    subsequently passing the subsequent vehicle along the route while obtaining a current view image of the route with an image capture device mounted to the subsequent vehicle; and
    resolving a pose of the subsequent vehicle relative to the survey trajectory by maximising a relation between the orthographic images and the current view image, wherein maximising a relation comprises maximising mutual information between the current view image and at least one of the orthographic images,
    wherein maximising mutual information between the current view image and at least one of the orthographic images includes evaluating Shannon entropy of the current view image and the at least one of the orthographic images individually and jointly.

2. A method according to claim 1, wherein creating the plurality of orthographic images of the route comprises creating a continuous, overhead image of the route.

3. A method according to claim 1 wherein creating the plurality of orthographic images comprises creating a continuous overhead image strip of the route.

4. A method according to claim 1, further comprising:
    storing at least the orthographic images in a repository, wherein the repository is remote and accessible to the subsequent vehicle by a wireless communication link.

5. A method according to claim 1, further comprising:
    storing at least the orthographic images in a repository, wherein the repository is available locally to the subsequent vehicle.

6. A method according to claim 1, wherein the image capture device mounted to the survey vehicle includes a stereo camera.

7. A method according to claim 6, wherein the stereo camera comprises at least a first and second imaging portion and the first imaging portion is arranged to image at least a portion of a route track and at least a portion of a route environment.

8. A method according to claim 7, wherein the second imaging portion is arranged to image only the route track.

9. Apparatus for localizing a vehicle along a route, the apparatus comprising:
    a camera for obtaining current view images of the route as the vehicle traverses the route;
    a repository of previously captured orthographic images of the route, obtained during a survey of the route; and
    a processor for resolving a pose of the vehicle along the route by processing the current view images obtained with the camera, with the previously captured orthographic images of the route, by maximising a relation between the previously captured orthographic images and the current view images, wherein maximising a relation comprises maximizing mutual information between the previously captured orthographic images and the current view images,
    wherein maximising mutual information between the previously captured orthographic images and the current view images includes evaluating Shannon entropy of the previously captured orthographic images and the current view images individually and jointly.

10. Apparatus according to claim 9, wherein the camera comprises a stereo camera.

11. A road vehicle capable of traversing the route and comprising the apparatus according to claim 9.

12. A non-transitory computer program product comprising computer code that when executed by one or more processors causes a process for localizing a vehicle along a route to be carried out, the process comprising:
    accessing a plurality of orthographic images of the route, the orthographic images previously captured at a plurality of locations along the route and defining a survey trajectory;
    receiving, from an image capture device, a current view image of the route;
    resolving a pose of the vehicle relative to the survey trajectory by maximising mutual information between the current view image and at least one of the previously captured orthographic images; and providing guidance for the vehicle based on the resolved pose, wherein maximising mutual information between the current view image and at least one of the previously captured orthographic images includes evaluating Shannon entropy of the current view image and the at least one of the previously captured orthographic images individually and jointly.

13. A computer program product according to claim 12, wherein accessing the plurality of orthographic images of the route comprises creating a continuous, overhead image of the route.

14. A computer program product according to claim 12, wherein accessing the plurality of orthographic images comprises creating a continuous overhead image strip of the route.

15. A computer program product according to claim 12, wherein accessing the plurality of orthographic images comprises receiving the orthographic images from a repository by a wireless communication link.

16. A computer program product according to claim 12, wherein the orthographic images are represented relative to a survey vehicle trajectory.

17. A computer program product according to claim 12, wherein the orthographic images are previously created during a survey and are obtained with a stereo camera, mounted on a survey vehicle.

18. A computer program product according to claim 17, wherein the stereo camera comprises at least a first and second imaging portion and the first imaging portion is arranged to image at least a portion of a route track and at least a portion of a route environment.

19. A method according to claim 1, wherein maximising mutual information between the current view and the at least one of the orthographic images includes evaluating quantized image intensities of the current view and the at least one of the orthographic images.

20. A road vehicle capable of traversing the route and comprising the computer program product according to claim 12.

21. A method according to claim 1, wherein resolving the pose of the vehicle includes correcting for any rolling and pitching of the subsequent vehicle and the survey vehicle.

* * * * *